(12) United States Patent
Hirata et al.

(10) Patent No.: US 9,420,133 B2
(45) Date of Patent: Aug. 16, 2016

(54) IMAGE FORMING APPARATUS

(71) Applicant: Konica Minolta, Inc., Chiyoda-ku, Tokyo (JP)

(72) Inventors: Katsuyuki Hirata, Toyokawa (JP); Kazuomi Sakatani, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/725,497

(22) Filed: May 29, 2015

(65) Prior Publication Data

US 2015/0350460 A1  Dec. 3, 2015

(30) Foreign Application Priority Data

May 29, 2014  (JP) .................................. 2014-111087

(51) Int. Cl.
*H04N 1/04* (2006.01)
*H04N 1/00* (2006.01)

(52) U.S. Cl.
CPC .................................. *H04N 1/0057* (2013.01)

(58) Field of Classification Search
CPC .................. G06K 9/00221; G06K 2215/0085; G06K 9/00624; G06K 9/00637; G06K 9/44; G06K 9/4604; G06K 9/6203; G06K 9/6271; G06K 9/66; G06T 5/20; G06T 5/006; G06T 2207/10008; G06T 2207/20012; G06T 2207/02
USPC ......... 358/1.9, 3.26, 474, 506, 487, 475, 505, 358/3.27, 406, 448, 501, 514, 518, 1.16, 358/1.2, 401, 447, 1.15, 540, 1.1, 1.13, 453, 358/463, 498, 519, 521; 382/167, 128, 131, 382/132, 173, 181, 274, 275, 282; 348/E5.034, 5.051, 148, 229.1, 231.99, 348/239, 345; 399/10, 24, 308, 43, 49, 53, 399/66, 8, 9; 709/230
See application file for complete search history.

(56) References Cited

U.S. PATENT DOCUMENTS

| | | | | |
|---|---|---|---|---|
| 5,991,010 A | * | 11/1999 | Nishio | .................. H04N 1/0284 355/40 |
| 6,832,008 B1 | * | 12/2004 | Wada | .................... H04N 1/4097 382/275 |
| 2002/0051639 A1 | * | 5/2002 | Enomoto | ............... G03B 17/24 396/311 |
| 2003/0053158 A1 | * | 3/2003 | Tsuji | .................... H04N 1/4097 358/518 |
| 2003/0076416 A1 | * | 4/2003 | Yamaguchi | .......... H04N 1/4074 348/162 |
| 2003/0090742 A1 | * | 5/2003 | Fukuda | .................... H04N 1/04 358/448 |

(Continued)

FOREIGN PATENT DOCUMENTS

JP  2013044947 A  3/2013

*Primary Examiner* — Negussie Worku
(74) *Attorney, Agent, or Firm* — Cantor Colburn LLP

(57) ABSTRACT

An image forming apparatus includes a control unit and first and second image scanning devices. The first and second image scanning devices scan the same surface of the same sheet with an image formed thereon on a sheet-conveying pathway. The image forming apparatus adjusts an image forming condition based on information acquired through the scan by the first and second image scanning devices. The first image scanning device scans only a part of an area in the main scanning direction. The second image scanning device scans an area across the image forming width in the main scanning direction. The control unit detects an anomalous value based on the information acquired through the scan by the second image scanning device, and prompts cleaning of the first and second image scanning devices in response to detection of the anomalous value.

10 Claims, 8 Drawing Sheets

(56) References Cited

U.S. PATENT DOCUMENTS

| | | | |
|---|---|---|---|
| 2005/0146697 A1* | 7/2005 | Iida | G03B 27/32 355/40 |
| 2005/0206982 A1* | 9/2005 | Hattori | H04N 1/6033 358/532 |
| 2010/0208312 A1* | 8/2010 | Hashizume | H04N 1/6019 358/523 |
| 2010/0302602 A1* | 12/2010 | Mikami | H04N 1/401 358/406 |
| 2011/0182606 A1* | 7/2011 | Okanishi | G03G 15/1605 399/66 |
| 2011/0222086 A1* | 9/2011 | Yamashita | H04N 1/6033 358/1.9 |
| 2012/0044541 A1* | 2/2012 | Kato | G03G 15/5025 358/448 |
| 2012/0120420 A1* | 5/2012 | Miyazaki | H04N 1/6033 358/1.9 |
| 2013/0004194 A1* | 1/2013 | Shirasaki | G03G 15/161 399/71 |
| 2013/0044234 A1* | 2/2013 | Nagano | H04N 5/23212 348/222.1 |
| 2013/0257935 A1* | 10/2013 | Arakane | B41J 2/04508 347/8 |
| 2013/0322904 A1* | 12/2013 | Murayama | G03G 15/16 399/66 |
| 2014/0153006 A1* | 6/2014 | Yorimoto | H04N 1/053 358/1.5 |
| 2014/0355074 A1* | 12/2014 | Matsui | H04N 1/401 358/461 |
| 2015/0071687 A1* | 3/2015 | Ishizumi | G03G 15/0121 399/301 |

* cited by examiner

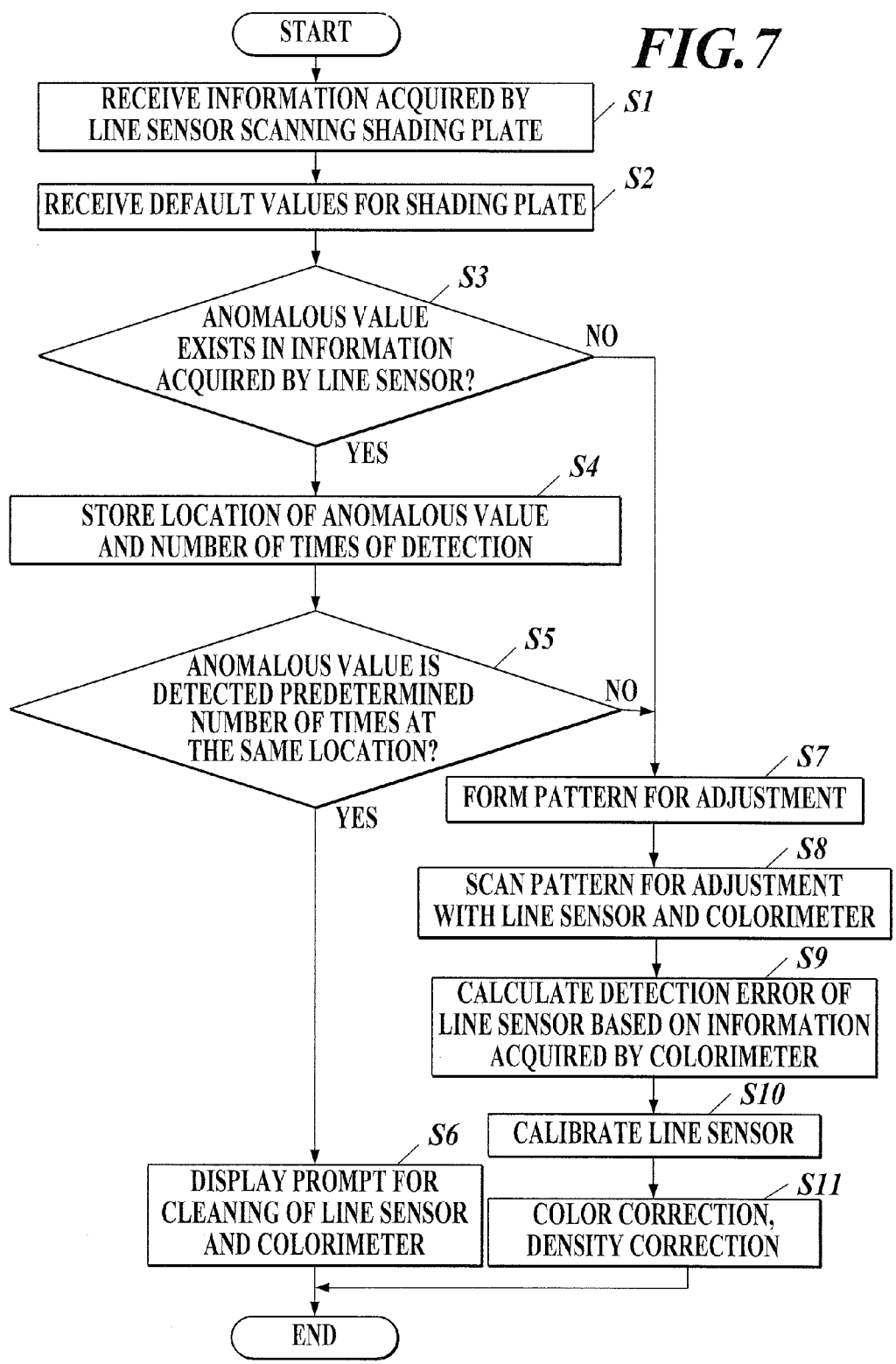

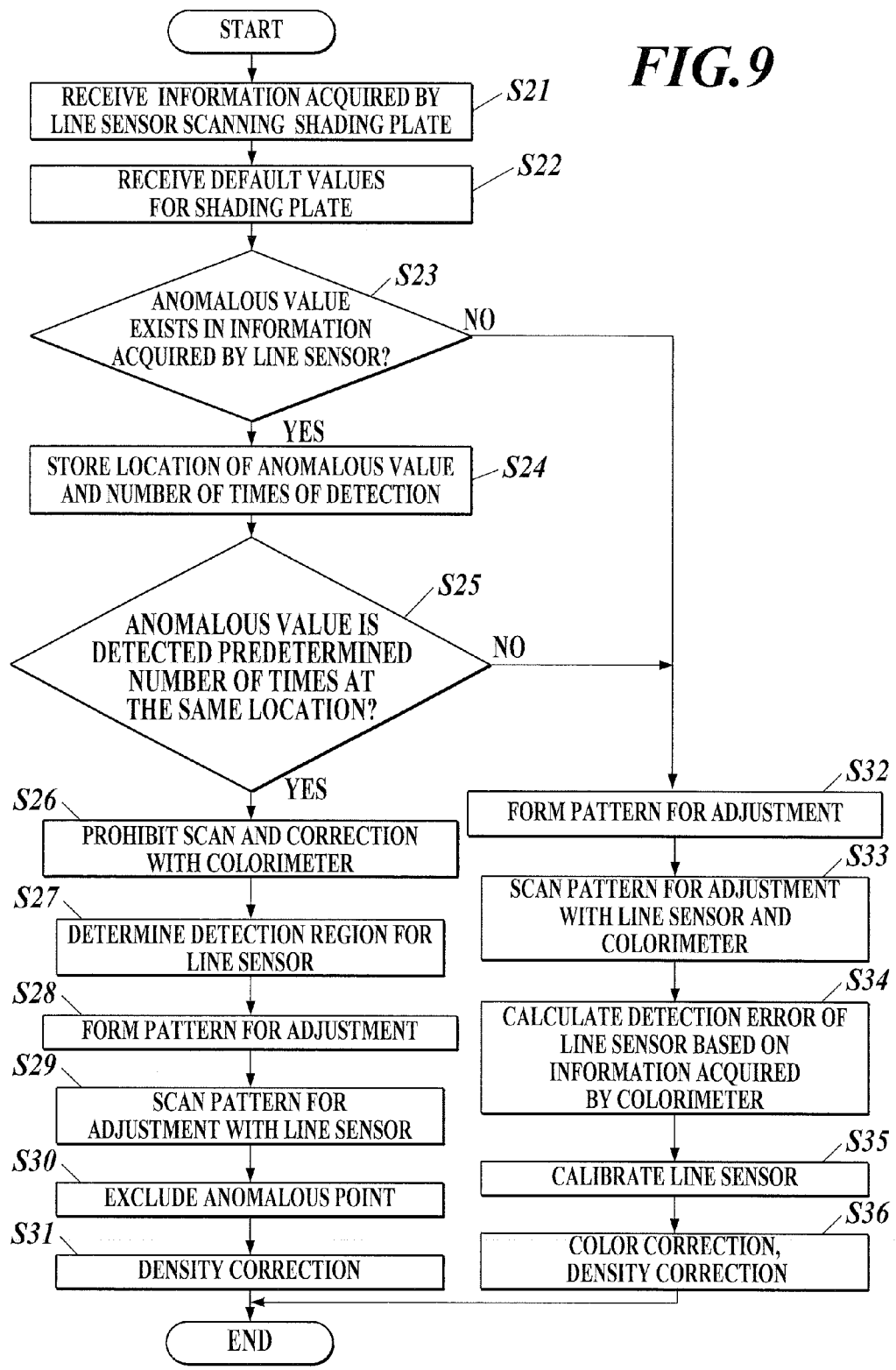

IMAGE FORMING APPARATUS

CROSS REFERENCE TO RELATED APPLICATIONS

The present invention claims priority under 35 U.S.C. §119 to Japanese Application No. 2014-111087 filed May 29, 2014, the entire content of which is incorporated herein by reference.

BACKGROUND OF THE INVENTION

1. Field of the Invention

The present invention relates to an image forming apparatus.

2. Description of Related Art

An electrophotographic image forming apparatus forms images by static electrical charge. Due to the nature of such an apparatus, the density, line width, and print position of the image vary with environmental conditions, such as temperature and humidity, and endurance change, leading to unstable output images.

To address such a challenge, image stabilizing control has been developed that involves disposing a toner sensor facing an intermediate transfer belt in the image forming apparatus to detect unfixed toner patches on the intermediate transfer belt, and feeding back the result of the detection to image forming conditions.

This approach, however, detects the unfixed toner patches on the intermediate transfer belt, requiring predictive control for variations that may arise in a secondary transfer unit and a fixing unit. This leads to insufficient quality stability.

To solve such a disadvantage, an image forming apparatus has recently included a line sensor on a sheet-conveying pathway after fixation to detect fixed color patches on a sheet and to feed back the results of the detection to the image forming conditions. This allows the apparatus to correct the image forming conditions in response to variations in the secondary transfer unit and the fixing unit (Japanese Unexamined Patent Application Publication No. 2013-44947). These approaches for image stabilizing control ensure stable quality on a single image forming apparatus.

A color image forming apparatus, however, has been increasingly required to ensure not only stable quality on a single image forming apparatus but also guarantee against absolute values of colors.

A color image forming apparatus, therefore, has been developed that involves output of a test chart including color patches, measurement of the test chart with a colorimeter, and feedback of the observed results to image forming conditions. Such a color image forming apparatus correlates the absolute value of a color with information acquired through the scan by the line sensor using the observed results from the colorimeter to calibrate the line sensor.

If the color image forming apparatus uses an external colorimeter, color adjustment should be performed offline. This complicates measurement of a color and feedback of the observed results and prolongs the adjustment time. An internal colorimeter, therefore, has been installed in a color image forming apparatus.

Unfortunately, if a color image forming apparatus includes an internal colorimeter, internally produced foreign materials, such as paper dust and spattered toner, possibly contaminate the colorimeter, although such a color image forming apparatus with an internal colorimeter can automatically adjust colors. A line sensor can detect foreign materials according to resolution of detecting elements disposed on a line in a main scanning direction even if the foreign materials attach to the detection head of the line sensor. Existence or non-existence of foreign materials, however, cannot be determined with a colorimeter because the colorimeter measures a spectral reflectance and a colorimetric value of a subject with foreign materials included. Thus, continuous use of an image scanning device that cannot provide determination of existence or non-existence of foreign materials may decrease the stability of the colors or density of an image.

SUMMARY OF THE INVENTION

The present invention has been accomplished in view of problems of these conventional approaches, and an object of the present invention is to enhance reliability of information acquired through the scan by an image scanning device and stability of an output image.

To achieve at least one of the abovementioned objects, an image forming apparatus reflecting one aspect of the present invention includes a control unit, a first image scanning device, and a second image scanning device, the first and second image scanning devices scanning a same surface of a same sheet with an image formed thereon on a sheet-conveying pathway, the image forming apparatus adjusting an image forming condition based on information acquired through the scan by the first and second image scanning devices; the first image scanning device scans only a part of an area in a main scanning direction; the second image scanning device scans an area across an image forming width in the main scanning direction; and the control unit detects an anomalous value based on the information acquired through the scan by the second image scanning device, and prompts cleaning of the first and second image scanning devices in response to detection of the anomalous value.

Preferably, the image forming apparatus further includes a storage unit which, in response to the detection of the anomalous value based on the information acquired through the scan by the second image scanning device, stores a location in the main scanning direction at which the anomalous value is detected and the number of times of the detection at the location, and the control unit prompts the cleaning of the first and second image scanning devices when the anomalous value has been detected a predetermined number of times at a same location in the main scanning direction.

Preferably, in the image forming apparatus, the second image scanning device has a higher scanning resolution than the first image scanning device.

Preferably, in the image forming apparatus, the first image scanning device is a colorimeter and the second image scanning device is a line sensor.

Preferably, the image forming apparatus further includes a calculating unit, both the first and second image scanning devices scan same color patches formed on the same surface of the same sheet; and the calculating unit estimates values corresponding to the information acquired through the scan by the first image scanning device from the information acquired through the scan by the second image scanning device, based on the information acquired by both the first and second image scanning devices scanning the same color patches.

An image forming apparatus reflecting another aspect of the present invention includes a control unit, a first image scanning device, and a second image scanning device, the first and second image scanning devices scanning a same surface of a same sheet with an image formed thereon on a sheet-conveying pathway, the image forming apparatus adjusting an image forming condition based on information acquired through the scan by the first and second image scanning devices; the first image scanning device scans only apart of an area in a main scanning direction; the second image scanning device scans an area across an image forming width in the main scanning direction; and the control unit detects an anomalous value based on the information acquired through the scan by the second image scanning device, and prohibits the scan by the first image scanning device in response to detection of the anomalous value.

Preferably, the image forming apparatus further includes a storage unit which, in response to the detection of the anomalous value based on the information acquired through the scan by the second image scanning device, stores a location in the main scanning direction at which the anomalous value is detected and the number of times of the detection at the location, and the control unit prohibits the scan by the first image scanning device when the anomalous value has been detected a predetermined number of times at a same location in the main scanning direction.

Preferably, in the image forming apparatus, the second image scanning device has a higher scanning resolution than the first image scanning device.

Preferably, in the image forming apparatus, the first image scanning device is a colorimeter and the second image scanning device is a line sensor.

Preferably, the image forming apparatus further includes a calculating unit, both the first and second image scanning devices scan same color patches formed on the same surface of the same sheet; and the calculating unit estimates values corresponding to the information acquired through the scan by the first image scanning device from the information acquired through the scan by the second image scanning device, based on the information acquired by both the first and second image scanning devices scanning the same color patches.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 7 is a flow chart illustrating a process of a first image adjustment mode.

FIG. 9 is a flow chart illustrating a process of a second image adjustment mode.

DESCRIPTION OF THE PREFERRED EMBODIMENTS

[First Embodiment]

A first embodiment of the image forming apparatus according to the present invention will now be described.

Figure 1:
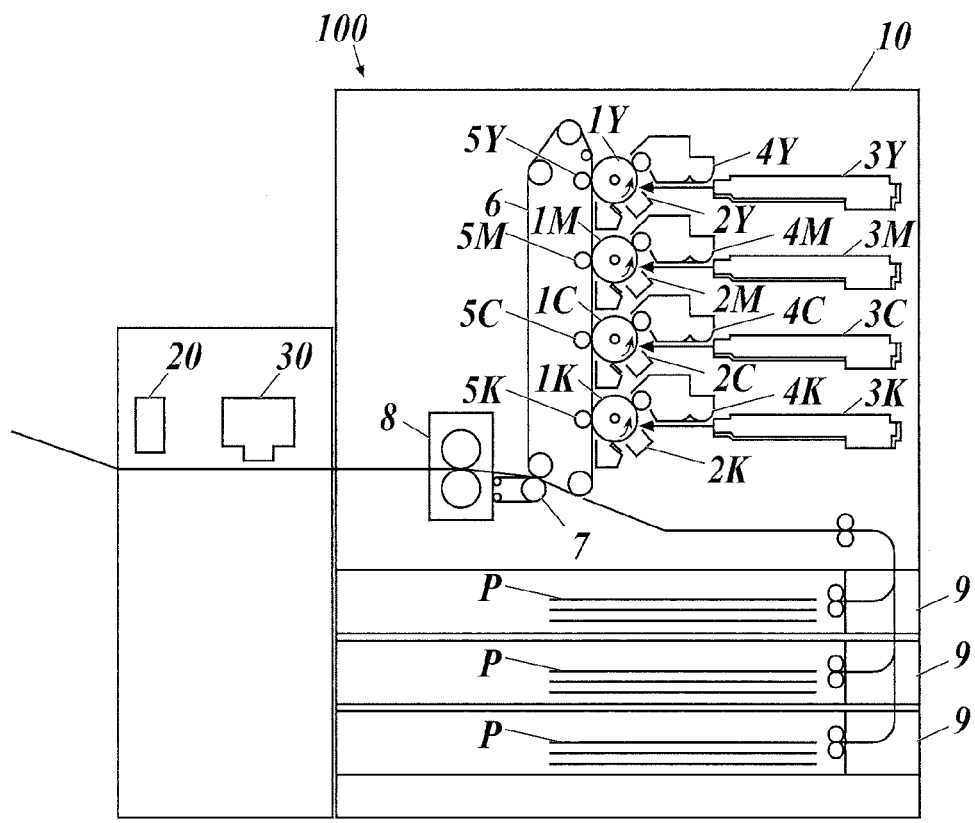
FIG. 1 is a schematic cross-sectional view of an image forming apparatus according to a first embodiment.

FIG. 1 is a schematic cross-sectional view of an image forming apparatus 100 of the first embodiment.

The image forming apparatus 100 includes an image forming unit 10, a colorimeter 20 as a first image scanning device, and a line sensor 30 as a second image scanning device.

The image forming unit 10 forms an electrophotographic color image based on image data corresponding to yellow (Y), magenta (M), cyan (C), and black (K) colors on a sheet P. The image forming unit 10 includes photoreceptor drums 1Y, 1M, 1C, and 1K, charging units 2Y, 2M, 2C, and 2K, exposing units 3Y, 3M, 3C, and 3K, developing units 4Y, 4M, 4C, and 4K, primary transfer rollers 5Y, 5M, 5C, and 5K, an intermediate transfer belt 6, a secondary transfer roller 7, a fixing unit 8, and sheet feeding units 9.

A yellow toner image is formed on the photoreceptor drum 1Y. The charging unit 2Y evenly charges the photoreceptor drum 1Y. The exposing unit 3Y irradiates the surface of the photoreceptor drum 1Y with a laser beam according to the yellow image data to form an electrostatic latent image. The developing unit 4Y causes yellow toner to settle on the electrostatic latent image on the photoreceptor drum 1Y for development of the yellow toner image.

This process is repeated for magenta, cyan, and black.

The primary transfer rollers 5Y, 5M, 5C, and 5K sequentially transfer the color toner images formed on the respective photoreceptor drums 1Y, 1M, 1C, and 1K onto the intermediate transfer belt 6 (primary transfer). In other words, a color toner image is composed of the four toner images superimposed together on the intermediate transfer belt 6.

The secondary transfer roller 7 then transfers the color toner image on the intermediate transfer belt 6 onto one surface of the sheet P fed by a sheet feeding unit 9 in a lump (secondary transfer).

The fixing unit 8 includes a heating roller for heating the sheet P with the transferred color toner image and a pressure roller for applying pressure on the sheet P, and causes the color toner image to settle on the sheet P through the heating and pressurization.

The colorimeter 20 and the line sensor 30 are disposed in proximity to each other in the conveying direction of the sheet P downstream of the fixing unit 8. Both the colorimeter 20 and the line sensor 30 can scan the same surface of the same sheet with the image formed thereon on a sheet-conveying pathway in the image forming apparatus. The colorimeter 20 and the line sensor 30 scan color patches formed on the sheet P.

The colorimeter 20 detects spectral reflectance of each wave length of light for the image formed on the sheet P to measure colors of the image. The colorimeter 20 can scan only a part of an area in the main scanning direction perpendicular to the conveying direction of the sheet P and parallel to the surface of the sheet.

Figure 2:
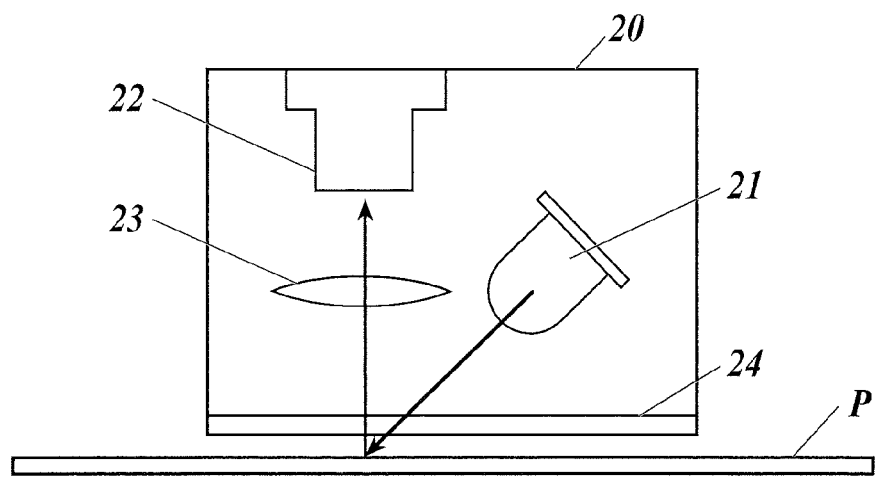
FIG. 2 is a schematic diagram illustrating the configuration of a colorimeter.

FIG. 2 illustrates the configuration of the colorimeter 20. The colorimeter 20 includes a light-emitting section 21, a light-receiving section 22, a lens 23, and a detection head 24.

The light-emitting section 21 irradiates the sheet P with light.

Figure 5:
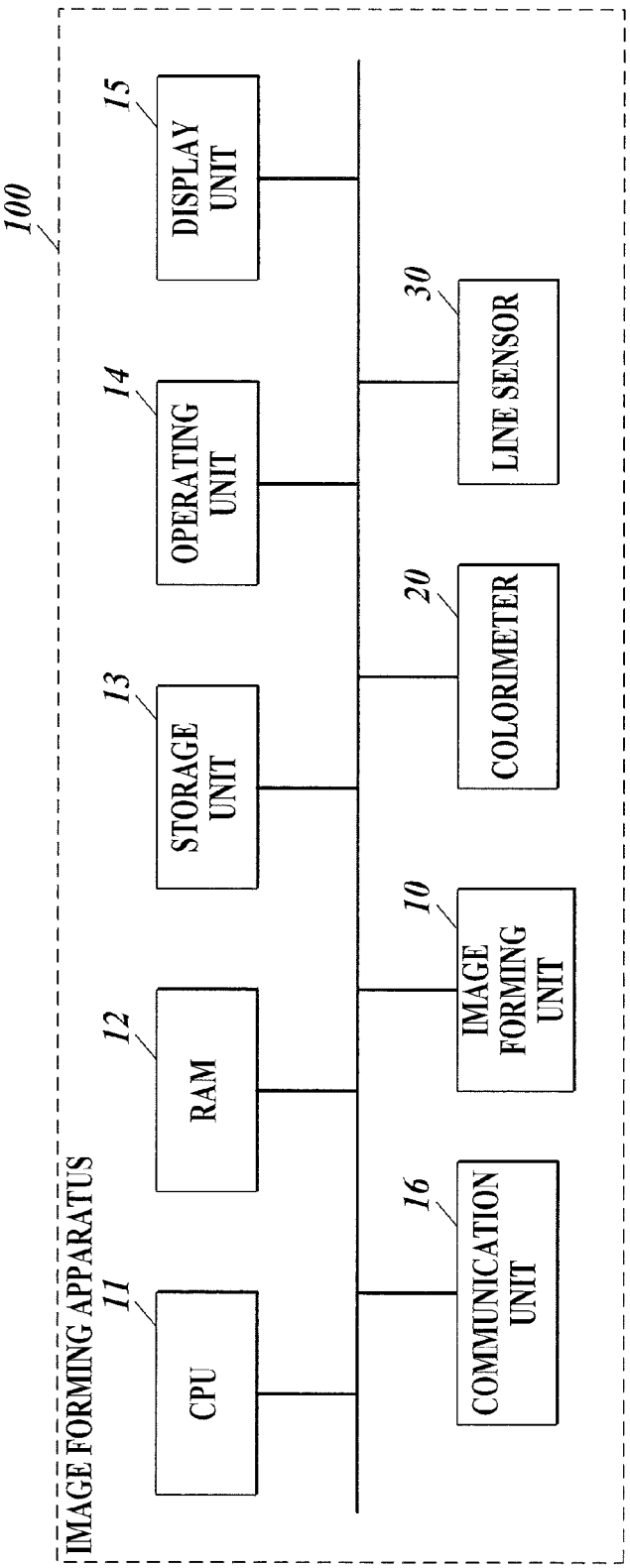
FIG. 5 is a block diagram illustrating the functional configuration of the image forming apparatus.

The light-receiving section 22 receives the light reflected from the sheet P and transmitted through the lens 23 and outputs colorimetric values, such as the XYZ values and the L*a*b* values, corresponding to the spectral reflectance for each wave length to a CPU 11 (see FIG. 5).

The detection head 24 is disposed on a position, facing the sheet P, on the colorimeter 20 and includes a glass plate.

The line sensor 30 includes multiple charge coupled devices (CCDs) that are arrayed in a line over the entire image forming width of the main scanning direction, and scans a one-dimensional image. The line sensor 30 performs the scanning according to the timing at which the sheet P with an image formed thereon advances. The line sensor 30 thereby scans a two-dimensional image formed on the sheet P. That is, the line sensor 30 can scan an image across the image forming width of the main scanning direction.

Figure 3:
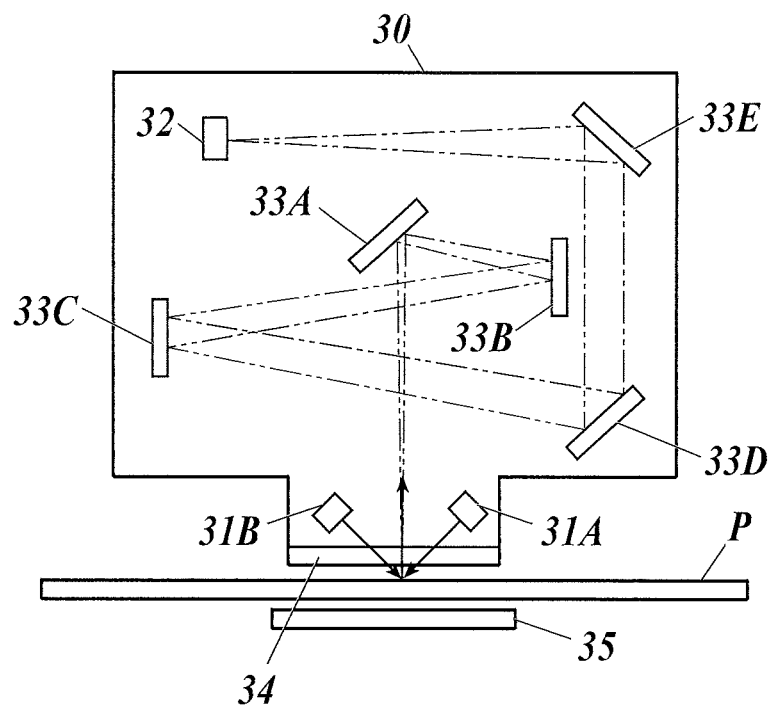
FIG. 3 is a schematic diagram illustrating the configuration of a line sensor.

FIG. 3 illustrates the configuration of the line sensor 30. The line sensor 30 includes light emitting diodes (LEDs) 31A and 31B, CCDs 32, mirrors 33A, 33B, 33C, 33D, and 33E, a detection head 34, and a shading plate 35.

The LEDs 31A and 31B irradiate the sheet P with light.

The CCDs 32 photoelectrically convert the incident light to output image data having gradation values for each of red (R), green (G), and blue (B) colors to the CPU 11.

The mirrors 33A, 33B, 33C, 33D, and 33E direct the light reflected from the sheet P to the CCDs 32.

The detection head 34 is disposed on a position, facing the sheet P, on the line sensor 30, and includes a glass plate.

The shading plate 35 is a white reference plate for reflecting the light from the LEDs 31A and 31B without absorbing the light, and is used for shading correction and detection of an anomalous value in the information acquired through the scan by the line sensor 30.

Figure 4:
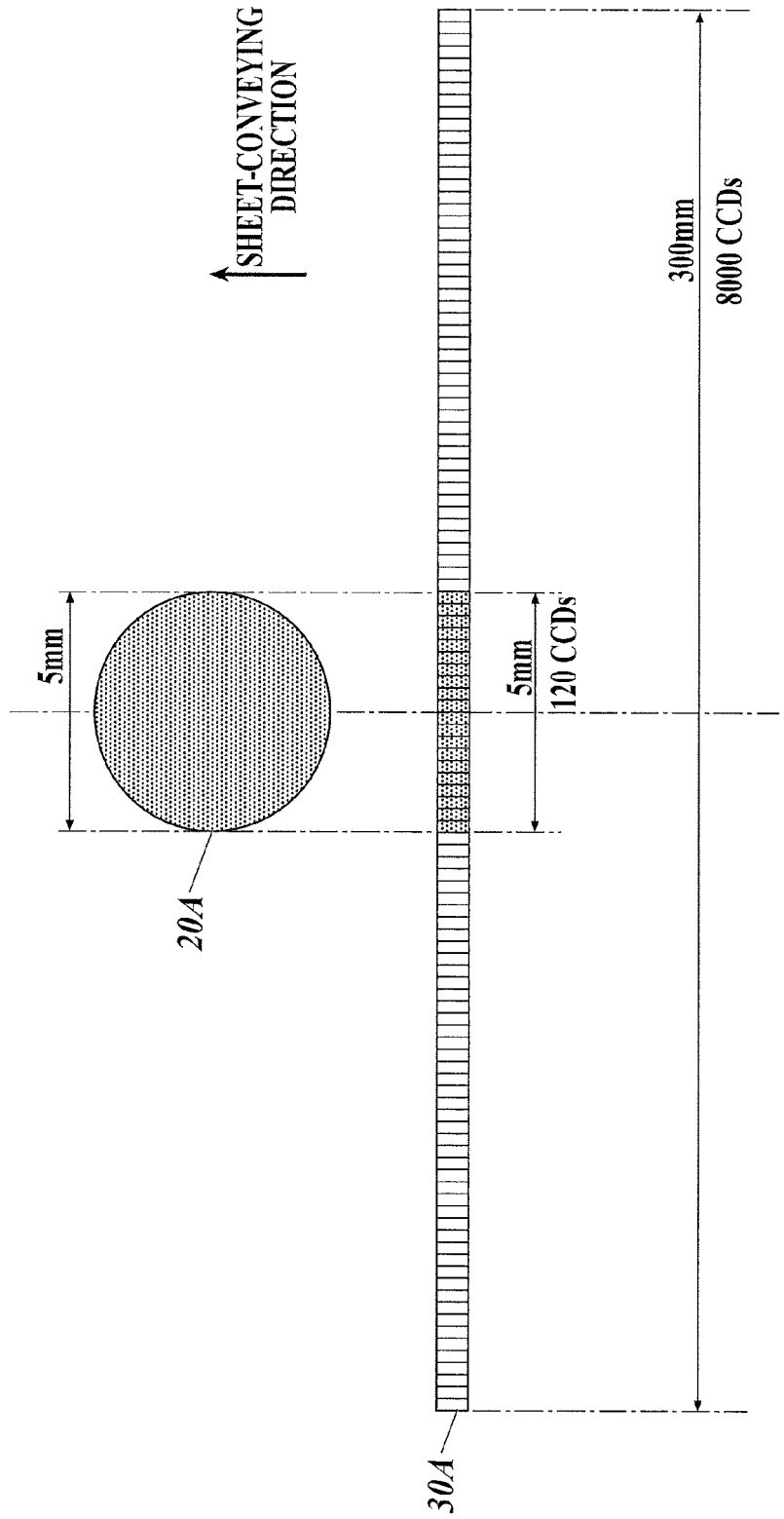
FIG. 4 is a schematic diagram illustrating scanning resolutions of the colorimeter and line sensor.

FIG. 4 is a diagram schematically illustrating the scanning resolutions of the colorimeter 20 and the line sensor 30. The scanning resolution of the line sensor 30 is higher than that of the colorimeter 20.

The colorimeter 20 typically performs spot detection with a detection range 20 A of approximately 5 mm, which is the smallest detectable unit. The colorimeter 20 measures the spectral reflectance of an image surface with a foreign material included therein if the foreign material exists within the detection range 20A of the colorimeter 20. Existence or non-existence of the foreign material thus cannot be determined with the colorimeter 20.

In contrast, the line sensor 30 has a detection range 30A of the width of the sheet P or wider. If the line sensor 30 can scan the sheet P of A3 size (over 300 mm), the detection range 30A of the line sensor 30 includes approximately 8,000 CCDs 32 for a resolution of 600 dpi. The smallest detectable unit corresponding to the resolution of 600 dpi is 0.04233 mm. An area corresponding to the spot diameter of 5 mm of the colorimeter 20 includes approximately 120 CCDs 32. The line sensor 30 has higher resolution compared to the colorimeter 20. The line sensor 30 thus can detect foreign materials the colorimeter 20 cannot detect.

FIG. 5 is a block diagram illustrating the functional configuration of the image forming apparatus 100.

As shown in FIG. 5, the image forming apparatus 100 includes the central processing unit (CPU) 11, a random access memory (RAM) 12, a storage unit 13, an operating unit 14, a display unit 15, a communication unit 16, the image forming unit 10, the colorimeter 20, and the line sensor 30.

The CPU 11 comprehensively controls operations of individual units in the image forming apparatus 100 according to various processing programs stored in the storage unit 13 in response to operating signals received from the operating unit 14 or instruction signals received at the communication unit 16.

The RAM 12 defines a work area for temporarily storing various processing programs, input and output data, and parameters read from the storage unit 13 for various processes executed by the CPU 11.

The storage unit 13 includes a hard disk and a flash memory, and stores various processing programs, and various data, such as parameters and files, necessary for execution of the processing programs.

For example, the storage unit 13 stores the locations in the main scanning direction at which anomalous values are detected based on the information acquired through the scan by the line sensor 30, and the numbers of times of the detection at the respective locations, the locations being associated with the respective numbers of times.

The storage unit 13 also stores default values for the information acquired by the line sensor 30 scanning the shading plate 35. The default values may be acquired at setup time of the image forming apparatus 100 or immediately after maintenance of the image forming apparatus 100.

The operating unit 14 includes a touch panel that covers a display screen of the display unit 15 and various buttons, such as numeric buttons and a start button, and outputs operating signals based on operations by a user to the CPU 11.

The display unit 15 includes a liquid crystal display (LCD), and displays various windows according to display signals received from the CPU 11.

The communication unit 16 transmits and receives data to and from an external device connected to a communication network, such as a local area network (LAN).

The CPU 11 adjusts image forming conditions for the image forming unit 10 based on the information acquired through the scan by the colorimeter 20 and the line sensor 30.

The CPU 11 receives information acquired by both the colorimeter 20 and the line sensor 30 scanning the same color patches formed on the same surface of the same sheet.

The CPU 11 estimates values corresponding to the information (colorimetric values) acquired by the colorimeter 20 from the information (RGB values) acquired by the line sensor 30, based on the information acquired by both the colorimeter 20 and the line sensor 30 scanning the same color patches. In other words, the CPU 11 serves as a calculating unit.

The CPU 11 determines existence or non-existence of an anomalous value based on the information acquired through the scan by the line sensor 30. If the CPU 11 detects an anomalous value, the CPU 11 prompts cleaning of the line sensor 30 and the colorimeter 20. Specifically, if the CPU 11 detects an anomalous value a predetermined number of times at the same location in the main scanning direction, the CPU 11 prompts cleaning of the line sensor 30 and the colorimeter 20.

Figure 6:
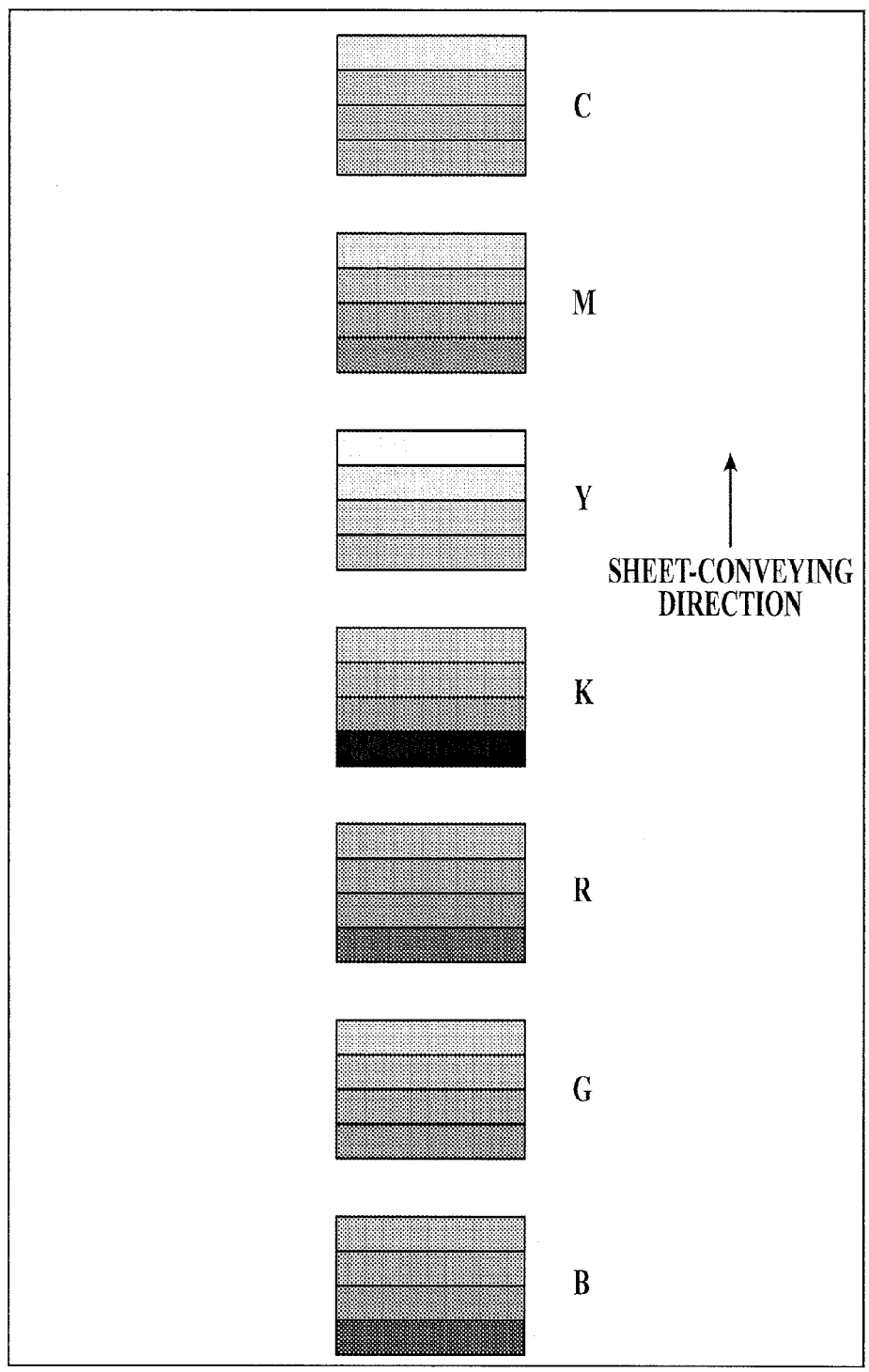
FIG. 6 is an exemplary pattern for adjustment.

FIG. 6 is an exemplary pattern for adjustment. The pattern for adjustment includes multiple gradation color patches for each of cyan (C), magenta (M), yellow (Y), black (K), red (R), green (G), and blue (B).

Operations of the image forming apparatus 100 according to the first embodiment will now be explained.

FIG. 7 is a flow chart illustrating a process of a first image adjustment mode. The process starts with power-on, at every predetermined period, or upon instruction from the user, and is implemented by software under collaboration between the CPU 11 and the programs stored in the storage unit 13.

The CPU 11 receives the information acquired by the line sensor 30 scanning the shading plate 35 (step S1). The line sensor 30 scans the shading plate 35 with no sheet P between the detection head 34 and the shading plate 35.

The CPU 11 then receives the default values, stored in the storage unit 13, for the information acquired by the line sensor 30 scanning the shading plate 35 (step S2).

The CPU 11 compares the default values with the current information acquired through the scan of the shading plate 35 to determine existence or non-existence of an anomalous value in the current information (step S3). For example, the CPU 11 calculates the difference between the current value and the default value for each of the R, G, and B information acquired through the scan by the line sensor 30 at each location in the main scanning direction, and the CPU 11 detects existence of an anomalous value if the absolute value of the difference is greater than a predetermined value. Alternatively, the CPU 11 calculates the difference between the current value and the average value in the main scanning direction for each of the R, G, and B information acquired through the scan by the line sensor 30 for each location, and the CPU 11 detects existence of an anomalous value if the absolute value of the difference is greater than a predetermined value.

Figure 8A:
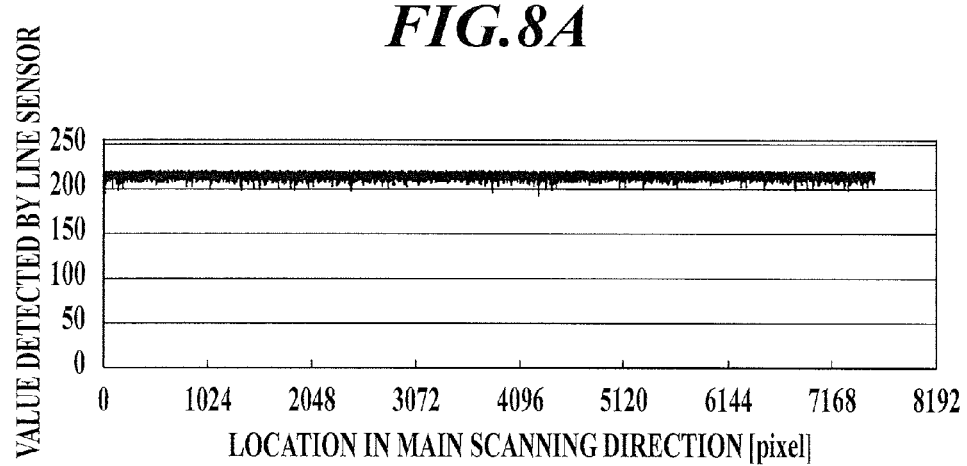
FIG. 8A is exemplary information acquired through the scan by the line sensor when no foreign material exists.
Figure 8B:
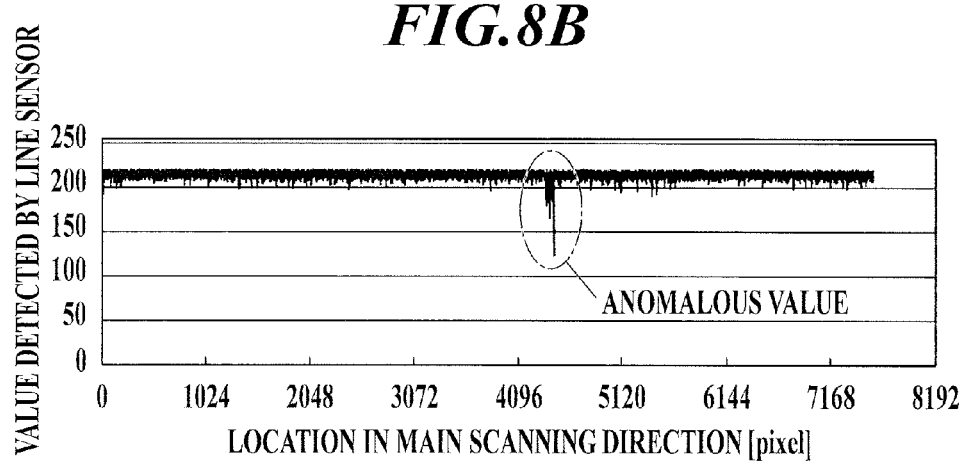
FIG. 8B is exemplary information acquired through the scan by the line sensor when a foreign material exists.

FIGS. 8A and 8B illustrate exemplary information acquired by the line sensor 30 scanning the shading plate 35. In FIGS. 8A and 8B, the horizontal axis represents location in the main scanning direction and the vertical axis represents value detected by the line sensor 30 for any of the R, G, and B channels. FIG. 8A illustrates exemplary acquired information without a foreign material, and FIG. 8B illustrates exemplary acquired information with a foreign material.

If the CPU 11 detects existence of an anomalous value in the information acquired through the scan by the line sensor 30 (step S3; YES), the CPU 11 stores, in the storage unit 13, the location in the main scanning direction at which the anomalous value is detected and the number of times an anomalous value has been detected at the location, in such a way that the location and the number of times are associated with each other (step S4). For example, the CPU 11 includes a counter for each location at which an anomalous value is detected in the main scanning direction. If the CPU 11 detects an anomalous value at any of these locations, the CPU 11 increments the corresponding counter value by one.

The CPU 11 determines whether the CPU 11 has detected an anomalous value a predetermined number of times (for example, twice) at the location of the currently detected anomalous value in the main scanning direction (step S5). If the CPU 11 has detected an anomalous value a predetermined number of times at the same location (step S5; YES), the CPU 11 displays a message for prompting cleaning of the line sensor 30 and the colorimeter 20 on the display unit 15 (step S6).

The user opens the door to a space in which the line sensor 30 and the colorimeter 20 are disposed in the image forming apparatus 100, and pulls out a unit including the line sensor 30 and the colorimeter 20. The user removes foreign materials, such as paper dust and spattered toner, adhering to the detection head 34 of the line sensor 30 and the detection head 24 of the colorimeter 20. For example, the user removes foreign materials from the surface of the detection head 34 of the line sensor 30 facing the sheet P and the surface of the detection head 24 of the colorimeter 20 facing the sheet P with paper or a cloth. After the cleaning, the user returns the unit including the line sensor 30 and the colorimeter 20 to the original position and closes the door.

If the CPU 11 detects no anomalous value in the information acquired by the line sensor 30 at step S3 (step S3; NO), or if the CPU 11 has not detected an anomalous value a predetermined number of times at the same location at the step S5 (step S5; NO), the CPU 11 reads image data of the pattern for adjustment from the storage unit 13 and controls the image forming unit 10 to form the pattern for adjustment on the sheet P (step S7).

The CPU 11 then receives information acquired by each of the line sensor 30 and the colorimeter 20 scanning the pattern for adjustment on the sheet P for each color patch (step S8). The CPU 11 receives the information acquired by both of the line sensor 30 and the colorimeter 20 scanning the same pattern for adjustment and stores the acquired information in the RAM 12 for each color patch.

The CPU 11 calculates a detection error in the information acquired by the line sensor 30 based on the information (colorimetric values) acquired by the colorimeter 20 for each color patch (step S9). Specifically, the CPU 11 converts the RGB values acquired by the line sensor 30 into colorimetric values, and calculates a deviation of the converted colorimetric values from the colorimetric values (absolute values) acquired by the colorimeter 20.

The CPU 11 then calibrates the line sensor 30 based on the calculated detection error (step S10). Specifically, the CPU 11 correlates the information (RGB values) acquired by the line sensor 30 with the information (colorimetric values) acquired by the colorimeter 20, and updates a calculation table for estimating values corresponding to the information acquired by the colorimeter 20 based on the information acquired by the line sensor 30. This calculation table allows the CPU 11 to estimate the values corresponding to the information acquired by the colorimeter 20, based on the information acquired by the line sensor 30.

The CPU 11 performs color correction (reconciliation of absolute values of colors) and density correction (gradation correction) based on the information acquired through the scan by the line sensor 30 calibrated at the step S10 and the information acquired through the scan by the line sensor 30 last time (step S11).

Upon completion of the step S6 or step S11, the process of the first image adjustment mode finishes.

As explained above, according to the first embodiment, a warning for prompting cleaning of the line sensor 30 and the colorimeter 20 is displayed based on the information acquired through the scan by the line sensor 30. This leads to enhanced reliability of the information acquired through the scan by the colorimeter 20 and enhanced stability of the color and density of an image.

Furthermore, when the CPU 11 detects an anomalous value in the information acquired through the scan by the line sensor 30, the CPU 11 determines the detection to be a temporal change if the number of times an anomalous value has been detected at the location is only less than a predetermined number. This prevents needless stops of the image forming apparatus.

In contrast, if the CPU 11 has detected an anomalous value a predetermined number of times at the same location in the information acquired through the scan by the line sensor 30, it is determined that foreign materials are likely to have adhered to the colorimeter 20, too, and prompts cleaning of not only the line sensor 30 but also the colorimeter 20. This prevents an inaccurate detection of color information by the colorimeter 20 due to the adhering foreign materials to the colorimeter 20.

An anomalous value of the line sensor 30 may be detected during the image forming operation by the image forming apparatus 100. For example, the line sensor 30 may scan the shading plate 35 between sheets on which images are to be consecutively formed, and then the CPU 11 may determine the existence or non-existence of an anomalous value. Such a detection, however, requires a halt of the normal image forming operation in the image forming apparatus 100 when the CPU 11 prompts cleaning of the line sensor 30 and the colorimeter 20 and forms the pattern for adjustment according to the existence or non-existence of an anomalous value.

In the first embodiment, the description has been made for the case where a message is displayed for prompting cleaning of the line sensor 30 and the colorimeter 20. Alternatively, the apparatus may turn on a warning light or make a warning sound for prompting cleaning of the line sensor 30 and the colorimeter 20.

Alternatively, the apparatus may include an internal cleaning unit instead of displaying a message for prompting cleaning of the line sensor 30 and the colorimeter 20. If an anomalous value is detected based on the information acquired through the scan by the line sensor 30, the apparatus may automatically clean the line sensor 30 and the colorimeter 20 with the internal cleaning unit.

In addition, the apparatus may repeat the process of the first image adjustment mode after the completion of the cleaning of the line sensor 30 and the colorimeter 20, following the step S6 of the process of the first image adjustment mode.

[Second Embodiment]

A second embodiment of the present invention will now be described.

An image forming apparatus according to the second embodiment has a similar configuration to that of the image forming apparatus 100 as described in the first embodiment.

Illustration and description of the configuration thus will be omitted by referring to FIGS. 1 to 5. Distinctive configuration and operations of the second embodiment will now be described.

The CPU 11 determines existence or non-existence of an anomalous value based on the information acquired through the scan by the line sensor 30. If the CPU 11 has detected an anomalous value, the CPU 11 prohibits the scan by the colorimeter 20. Specifically, the CPU 11 prohibits the scan by the colorimeter 20 if the CPU 11 detects an anomalous value a predetermined number of times at the same location in the main scanning direction.

Operations of the image forming apparatus according to the second embodiment will now be explained.

FIG. 9 is a flow chart illustrating a process of a second image adjustment mode. The process starts with power on, at every predetermined period, or upon instruction from the user, and is implemented by software under collaboration between the CPU 11 and the programs stored in the storage unit 13.

Operations of steps S21 to S25 are identical to those of the steps S1 to S5 in FIG. 7, and redundant explanation is avoided.

At the step S25, if the CPU 11 has detected an anomalous value a predetermined number of times at the same location (S25; YES), the CPU 11 prohibits the scan by the colorimeter 20 and the correction (color correction) with the information acquired through the scan by the colorimeter 20 (step S26).

The CPU 11 then determines a detection region of the line sensor 30 based on the location at which the CPU 11 has detected an anomalous value a predetermined number of times (step S27). Specifically, the CPU 11 excludes the location at which the CPU 11 has detected an anomalous value a predetermined number of times in the main scanning direction from the detection region of the line sensor 30.

The CPU 11 reads the image data of the pattern for adjustment from the storage unit 13, and controls the image forming unit 10 to form the pattern for adjustment on the sheet P (step S28).

The CPU 11 then receives information acquired by the line sensor 30 scanning the pattern for adjustment on the sheet P for each color patch (step S29). The CPU 11 stores the information acquired through the scan by the line sensor 30 in the RAM 12 for each color patch.

The CPU 11 then excludes the location (referred to as an anomalous point hereinafter) at which the CPU 11 has detected an anomalous value a predetermined number of times from the information acquired through the scan by the line sensor 30 based on the detection region of the line sensor 30 set at the step S27 (step S30). In other words, no information is determined to exist for the location at which the CPU 11 has detected an anomalous value a predetermined number of times.

The CPU 11 then performs density correction based on the information acquired by the line sensor 30 from which anomalous points are removed and the information acquired through the scan by the line sensor 30 last time (step S31).

The CPU 11 corrects the density based only on the information acquired by the line sensor 30, not on the information from the colorimeter 20. This correction does not ensure the absolute values of the density and color, but it is a relative correction.

If the CPU 11 detects no anomalous value in the information acquired through the scan by the line sensor 30 at the step S23 (step S23; NO), or if the CPU 11 has not detected an anomalous value a predetermined number of times at the same location at the step S25 (step S25; NO), the process proceeds to step S32.

The operations of steps S32 to S36 are identical to those of steps S7 to S11 illustrated in FIG. 7, and redundant explanation is avoided.

The CPU 11 performs corrections based on both the information acquired through the scan by the colorimeter 20 and the information acquired through the scan by the line sensor 30, and guarantees absolute values of the density and color.

Upon completion of the step S31 or step S36, the process of the second image adjustment mode finishes.

As explained above, according to the second embodiment, the CPU 11 prohibits the scan by the colorimeter 20 and the correction with the information acquired through the scan by the colorimeter 20, based on the information acquired through the scan by the line sensor 30. This leads to enhanced reliability of the information acquired through the scan by the colorimeter 20 and enhanced stability of the color and density of an image.

If the CPU 11 has detected an anomalous value a predetermined number of times at the same location in the information acquired through the scan by the line sensor 30, it is determined that foreign materials are likely to have adhered to the colorimeter 20. The CPU 11 then prohibits the scan by the colorimeter 20 and the correction with the information from the colorimeter 20, and scans the color patches and performs the correction only with the line sensor 30. In this case, although the absolute colorimetric values are not guaranteed for an image, the current image quality can be maintained.

Furthermore, the CPU 11 performs the correction while ignoring or excluding the information on the anomalous point(s), which is regarded as a region with adhering foreign materials, from the information acquired through the scan by the line sensor 30. This can prevent an inaccurate detection due to the adhesion of foreign materials.

An anomalous value of the line sensor 30 may be detected during the image forming operation of the image forming apparatus.

The cleaning of the line sensor 30 and the colorimeter 20 may be conducted after the step S31 of the process of the second image adjustment mode. The apparatus may repeat the process of the second image adjustment mode after completion of the cleaning of the line sensor 30 and the colorimeter 20.

Each of the above embodiments has described an exemplary image forming apparatus according to the present invention, and the image forming apparatus according to the present invention should not be limited to these embodiments. Various modifications may be made in details of configuration and operations of each unit of the image forming apparatus within the scope of the present invention.

For example, the chart for adjustment may include color patches to be scanned only by the line sensor 30 in addition to the color patches to be scanned by both the colorimeter 20 and the line sensor 30.

The apparatus may include a contact-type optical sensor such as a contact image sensor (CIS) as the line sensor 30.

In each of the above embodiments, it is determined that foreign materials are likely to have adhered to the colorimeter 20 if the CPU 11 has detected an anomalous value a predetermined number of times at one and the same location based on the information acquired through the scan by the line sensor 30. Alternatively, it may be determined that foreign materials are likely to have adhered to the colorimeter 20 if the CPU 11 detects an anomalous value one time at any location.

The apparatus may include a toner sensor disposed on a position facing the intermediate transfer belt 6 and detect the amount of a toner on the intermediate belt 6. The apparatus may perform the image stabilizing control by varying the image forming conditions in the image forming unit 10 according to the result of the detection of the amount of the toner.

In each of the above embodiments, an exemplary electrophotographic image forming apparatus has been described. The present invention, however, may be applied to other types of image forming apparatuses, such as an ink-jet type or print-type.

In the above embodiments, a hard disk or a flash memory is used as a computer-readable medium having stored thereon programs for executing various operations. The configuration of the computer-readable medium, however, should not be limited to those of the embodiments. A portable storage medium, such as a CD-ROM, may be used as another example of the computer-readable medium. Carrier waves may be used as a medium for providing data of the programs over a communication link.

The entire disclosure of Japanese Patent Application No. 2014-111087 filed on May 29, 2014 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image forming apparatus comprising:
a control unit,
a first image scanning device, and
a second image scanning device,
wherein the first and second image scanning devices are configured to scan a same surface of a same sheet with an image formed thereon on a sheet-conveying pathway,
the image forming apparatus is configured to adjust an image forming condition based on information acquired through the scan by the first and second image scanning devices,
the first image scanning device is configured to scan only a part of an area in a main scanning direction;
the second image scanning device is configured to scan an area across an image forming width in the main scanning direction; and
the control unit is configured to detect an anomalous value based on the information acquired through the scan by the second image scanning device, and prompt cleaning of the first and second image scanning devices in response to detection of the anomalous value.

2. The image forming apparatus according to claim 1, further comprising a storage unit configured to, in response to the detection of the anomalous value based on the information acquired through the scan by the second image scanning device, store a location in the main scanning direction at which the anomalous value is detected and the number of times of the detection at the location,
wherein the control unit prompts the cleaning of the first and second image scanning devices when the anomalous value has been detected a predetermined number of times at a same location in the main scanning direction.

3. The image forming apparatus according to claim 1, wherein the second image scanning device has a higher scanning resolution than the first image scanning device.

4. The image forming apparatus according to claim 1, wherein the first image scanning device is a colorimeter and the second image scanning device is a line sensor.

5. The image forming apparatus according to claim 4, further comprising a calculating unit, wherein
both the first and second image scanning devices are configured to scan same color patches formed on the same surface of the same sheet; and
the calculating unit is configured to estimate values corresponding to the information acquired through the scan by the first image scanning device from the information acquired through the scan by the second image scanning device, based on the information acquired by both the first and second image scanning devices scanning the same color patches.

6. An image forming apparatus comprising:
a control unit,
a first image scanning device, and
a second image scanning device,
wherein the first and second image scanning devices are configured to scan a same surface of a same sheet with an image formed thereon on a sheet-conveying pathway,
the image forming apparatus is configured to adjust an image forming condition based on information acquired through the scan by the first and second image scanning devices, wherein
the first image scanning device is configured to scan only a part of an area in a main scanning direction;
the second image scanning device is configured to scan an area across an image forming width in the main scanning direction; and
the control unit is configured to detect an anomalous value based on the information acquired through the scan by the second image scanning device, and prohibit the scan by the first image scanning device in response to detection of the anomalous value.

7. The image forming apparatus according to claim 6, further comprising a storage unit structured to, in response to the detection of the anomalous value based on the information acquired through the scan by the second image scanning device, store a location in the main scanning direction at which the anomalous value is detected and the number of times of the detection at the location,
wherein the control unit is configured to prohibit the scan by the first image scanning device when the anomalous value has been detected a predetermined number of times at a same location in the main scanning direction.

8. The image forming apparatus according to claim 6, wherein the second image scanning device has a higher scanning resolution than the first image scanning device.

9. The image forming apparatus according to claim 6, wherein the first image scanning device is a colorimeter and the second image scanning device is a line sensor.

10. The image forming apparatus according to claim 9, further comprising a calculating unit, wherein
   both the first and second image scanning devices are configured to scan same color patches formed on the same surface of the same sheet; and
   the calculating unit is configured to estimate values corresponding to the information acquired through the scan by the first image scanning device from the information acquired through the scan by the second image scanning device, based on the information acquired by both the first and second image scanning devices scanning the same color patches.

\* \* \* \* \*